United States Patent
Junghans et al.

(10) Patent No.: US 9,594,694 B2
(45) Date of Patent: Mar. 14, 2017

(54) DYNAMIC EVALUATION AND ADAPTION OF HARDWARE HASH FUNCTIONS

(71) Applicant: INTERNATIONAL BUSINESS MACHINES CORPORATION, Armonk, NY (US)

(72) Inventors: Sascha Junghans, Boeblingen (DE); Matthias Klein, Boeblingen (DE); Thomas Schlipf, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/993,583

(22) Filed: Jan. 12, 2016

(65) Prior Publication Data

US 2016/0124865 A1    May 5, 2016

Related U.S. Application Data

(63) Continuation of application No. 14/060,900, filed on Oct. 23, 2013, now Pat. No. 9,274,800.

(30) Foreign Application Priority Data

Nov. 28, 2012  (GB) .................................. 1221364.1

(51) Int. Cl.
  *G06F 3/00*   (2006.01)
  *G06F 12/10*  (2016.01)
  *G06F 9/38*   (2006.01)
  *G06F 1/16*   (2006.01)
  *G06F 1/03*   (2006.01)

(52) U.S. Cl.
  CPC ........ *G06F 12/1018* (2013.01); *G06F 9/3838* (2013.01); *G06F 1/0328* (2013.01); *G06F 1/1615* (2013.01); *G06F 2212/401* (2013.01)

(58) Field of Classification Search
  CPC . G06F 1/02; G06F 1/03; G06F 1/0328; G06F 1/1615
  (Continued)

(56) References Cited

U.S. PATENT DOCUMENTS 7,418,505 B2 *  8/2008  Lim ........................ H04L 45/00
                                                     370/235
7,738,454 B1     6/2010  Panwar et al.
(Continued)

OTHER PUBLICATIONS

Widiger, H. et al., "Packet Classification with Evolvable Hardware Hash Functions—An Intrinsic Approach," Biologically Inspired Approaches to Advanced Information Technology Lecture Notes in Computer Science vol. 3853, Jan. 2006, pp. 64-79.
(Continued)

*Primary Examiner* — Idriss N Alrobaye
*Assistant Examiner* — Getente A Yimer
(74) *Attorney, Agent, or Firm* — William A. Kinnaman, Esq.; Matthew M. Hulihan, Esq.; Heslin Rothenberg Farley & Mesiti PC

(57) ABSTRACT

Creating hash values based on bit values of an input vector. An apparatus includes a first and a second hash table, a first and second hash function generator adapted to configure a respective hash function for a creation of a first and second hash value based on the bit values of the input vector. The hash values are stored in the respective hash tables. An evaluation unit includes a comparison unit to compare a respective effectiveness of the first hash function and the second hash function, and an exchanging unit responsive to the comparison unit adapted to replace the first hash function by the second hash function.

17 Claims, 6 Drawing Sheets

(58) Field of Classification Search
USPC .................................... 710/1, 7, 8, 15, 59
See application file for complete search history.

(56) References Cited

U.S. PATENT DOCUMENTS

| | | | |
|---|---|---|---|
| 7,835,993 B2 | 11/2010 | Okamoto et al. | |
| 7,941,633 B2 | 5/2011 | Byers et al. | |
| 7,990,973 B2 | 8/2011 | Hao et al. | |
| 8,959,155 B1 | 2/2015 | Kwok et al. | |
| 2003/0093552 A1* | 5/2003 | Nonogaki | G06F 21/606 709/237 |
| 2008/0059601 A1* | 3/2008 | Yoshikawa | H04L 69/324 709/212 |
| 2008/0229056 A1* | 9/2008 | Agarwal | G06F 17/30949 711/216 |
| 2009/0157972 A1* | 6/2009 | Byers | G06F 12/0864 711/133 |
| 2010/0005309 A1 | 1/2010 | Gentry et al. | |
| 2010/0058027 A1* | 3/2010 | Gong | G06F 17/30628 711/216 |
| 2010/0185680 A1 | 7/2010 | Gilboa | |
| 2011/0106866 A1 | 5/2011 | Grayson et al. | |
| 2012/0158729 A1 | 6/2012 | Mital et al. | |

OTHER PUBLICATIONS

Hua, N. et al., "Non-Crypto Hardware Hash Functions for High Performance Networking ASICs," ANCS '11 Proceedings of the 2011 ACM/IEEE Seventh Symposium on Architectures for Networking and Communications Systems, Oct. 2011, pp. 156-166.
Ramakrishna, M. et al., "Efficient Hardware Hashing Functions for High Performance Computers," IEEE Transactions on Computers, vol. 46, No. 12, Dec. 1997, pp. 1378-1381.
Ahmadi, Mahmood et A., "Hashing Functions Performance in Packet Classification," http://citeseerx.ist.psu.edu/viewdoc/summary?doi=10.1.1.62.9642, (no date information available), pp. 1-6.
Ramakrishna, M. et al., "A Performance Study of Hashing Functions for Hardware Applications," Proc. ICCI'94, International Conference on Computing and Information, 1994 (no further date information available) pp. 1621-1636.
Puŝ, Viktor et al., "Fast and Scalable Packet Classification Using Perfect Hash Functions," FPGA '09, http://delivery.acm.org/10.1145/1510000/1508163/p229-pus.pdf?ip=59.164.109.232
&acc=ACTIVE%20SERVICE&CFID=100543000
&CFTOKEN=28563688&_acm_=1343906279_
b84f0892d3efd9b69ee6098a6d61f565 Feb. 2009, pp. 229-235.
Kirsch, Adam et al., "Hash-Based Techniques for High-Speed Packet Processing," http://www.eecs.harvard.edu/~michaelm/postscripts/dimacs-chapter-08.pdf. (no date information available), pp. 1-40.
Office Action in U.S. Appl. No. 14/060,900, dated Apr. 13, 2015, pp. 1-11.
Notice of Allowance in U.S. Appl. No. 14/060,900, dated Nov. 3, 2015, pp. 1-14.

* cited by examiner 600 method for creating hash values 602 providing a 1st hash table 604 configuring the 1st hash table 606 providing a 2nd hash table 608 configuring the 2nd hash table 610 comparing a respective effectiveness of the 1st and 2nd hash function 612 responsive to the comparison, replacing the 1st hash function by the 2nd hash function

FIG. 6

DYNAMIC EVALUATION AND ADAPTION OF HARDWARE HASH FUNCTIONS

BACKGROUND

One or more aspects of the invention relate generally to an apparatus for creating hash values, a method for creating hash values, a computer program product, as well as a data processing program for creating hash values.

In modern processors of computers, e.g., microprocessors, instruction or address ordering has a high relevance because it may influence the overall performance of the microprocessor. If instructions or addresses may be executed or used in parallel or, in an order that may not be the same as the instructions/data are stored or come as input stream to the processor, the performance of the processor can go up. A strict order execution may slow down the overall performance of processors that are equipped with parallel execution units. However, the strict order may be required if single instructions are dependent from each other and thus, need to be executed one after the other.

Therefore, it is a requirement to decide which addresses need to be handled sequentially and which addresses may be handled independently from its incoming sequence. If there is an ordering dependency then the subsequent operations need to wait until the previous operation achieved a certain state in its execution.

Consequently, there is a need for an address comparison to determine a proper ordering. E.g., if there are equal addresses an ordering dependency exists. However, modern processors work with 64 bit addresses. Performing an address comparison between many operations/instructions using, e.g., 64 bit addresses is "costly" or time consuming meaning it may take a while to complete. Additionally, complete 64 bit comparison units require relative large amounts of space on the processor chip.

Therefore, processor designers work with hash algorithms and hash tables to address that problem. A hash function is a well-defined procedure or mathematical function for turning data—here addresses, e.g., 64 bit long—into a relatively small integer value referred to as a hash value, which is typically distributed across a range known as a hash range. The number of bits of the resulting hash value is typically much lower than the original address.

Using such an approach addresses the problem of chip area required and speed of execution. Instead of comparing full addresses—e.g., 64 bit addresses—only related hash values are compared. Typically, hash functions use fixed information from the full address.

There are several disclosures related to an apparatus for creating hash values.

Document U.S. Pat. No. 7,941,633B2, hereby incorporated herein by reference in its entirety, discloses a computer-implemented method, apparatus and program product for an automatic optimization of hash function operations by recognizing when a first hash function results in an unacceptable number of cache misses, and a dynamic trying of another hash function to determine which hash function results in the most cache hits. In this manner, hardware optimizes hash function operation in the face of changing loads and associated data flow patterns.

However, this document is related to an evaluation of cache hits and misses. An evaluation of a hash function is made based on a comparison of a cache miss rate determined by the hash function in use with a register value. If the comparison delivers a negative result a new hash function is tried. Hence, this disclosure does not address problems in optimization of an ordering optimization of an input stream of a mixture of addresses, data and instructions.

BRIEF SUMMARY

Thus, there may be a need for an optimization of an ordering of an input stream of a mixture of addresses, data and instructions to a processor.

This need may be addressed by an apparatus for creating hash values, and a method for creating hash values according to the independent claims.

According to one embodiment, an apparatus for creating hash values is provided. The hash values may be based on bit values, in particular individual bit values—of an input vector. The apparatus comprises, for example, a first hash table, a first hash function generator adapted to configure a first hash function for a creation of a first hash value based on the bit values of the input vector, the first hash value to be stored in the first hash table, and an evaluation unit responsive to the bit values of the input vector to test a second hash function. The evaluation unit comprises, for example, a second hash table with fewer entries than the first hash table, a second hash function generator adapted to configure the second hash function for a creation of a second hash value based on the bit values of the input vector, the second hash value to be stored in the second hash table. The evaluation unit also comprises, for example, a comparison unit to compare a respective effectiveness of the first hash function and the second hash function, and an exchanging unit responsive to the comparison unit adapted to replace the first hash function by the second hash function.

According to another embodiment, a method of creating hash values based on bit values of an input vector is provided. The method comprises, for instance, providing a first hash table, configuring a first hash function for a creation of a first hash value based on the bit values of the input vector, the first hash value—or hash values—to be stored in the first hash table, and providing a second hash table with less entries than the first hash table. The method also comprises, for example, configuring a second hash function for a creation of a second hash value based on the bit values of the input vector, the second hash value—or hash values—to be stored in the second hash table, comparing a respective effectiveness of the first hash function and the second hash function, and responsive to the comparison, replacing the first hash function by the second hash function.

BRIEF DESCRIPTION OF THE SEVERAL VIEWS OF THE DRAWINGS

Embodiments of the invention will now be described, by way of example only, and with reference to the following drawings:

FIG. 6 shows a block diagram of the method for creating hash function values.

DETAILED DESCRIPTION

Figure 1A:
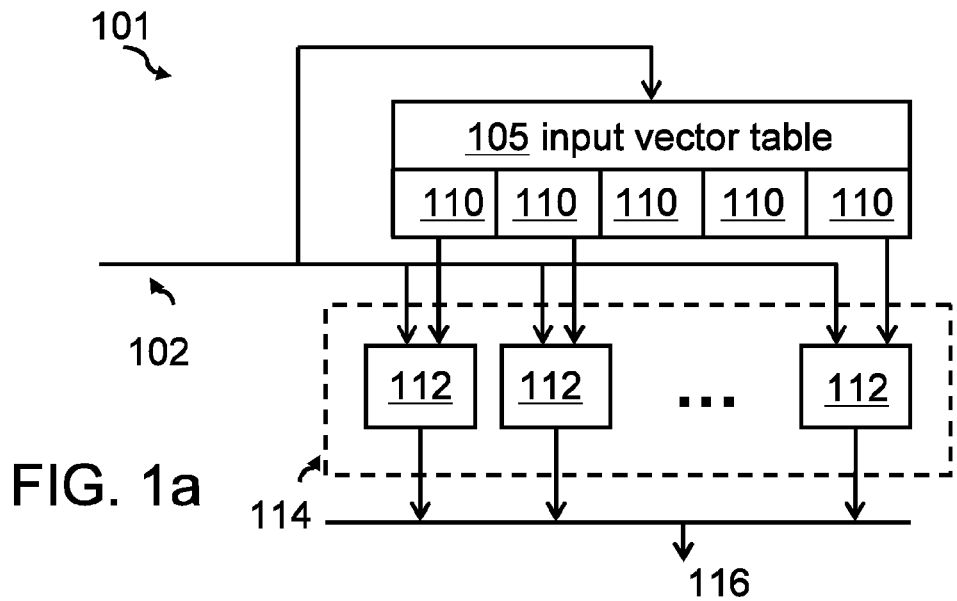
FIG. 1a shows a simple mechanism in a block diagram to detect ordering conflict of incoming input vectors to a processor.

In the context of this description, the following conventions, terms and/or expressions may be used:

The term 'hash value' may denote a result of a hash function. A hash function may be a well-defined procedure or mathematical function for converting data—or a bit pattern of a certain length—into a bit pattern having a smaller length.

The term 'input vector' may denote a bit pattern which may represent addresses, data and/or instructions for a processor.

The term 'hash table' may denote a storage area for storing hash values generated by a hash function. Here, the input vector may be input to a hash function, and the results of the hash function for different input vectors may be stored in the hash table.

The term 'hash function generator" may denote a digital logic unit—either implemented in hardware or on software, or a combination of both—that may produce a hash function such that an input vector to the hash function may result in a hash value. Different hash functions—as generated by the hash function generator—may result in different hash values for the same input vector.

The term 'configure a hash function' may denote a process defining a hash function of defining the logic involved in generating a hash value based on an input vector comprising, e.g., n bits.

The term 'evaluation unit' may denote a logic unit being adapted to compare outcomes of other units, e.g., hash functions or counters for addressing conflict or address violations.

The term 'entry in a hash table' may denote a storage area for a digital value, preferably a resulting value of a hash function.

The term 'comparison unit' may denote a digital unit being able to compare two digital values, in particular values of counters. A result of the comparison may be that one value is greater than the other.

The term 'effectiveness' may here denote a result of an evaluation which may compare result values. "Effectiveness" relates to "making the right things" in contrast to "making the things right" which may relate to the term 'efficiency'. Here, it may relate to the question of using the right hash function and not using the existing hash function in a most effective way.

The term 'exchanging unit' may denote a unit that may be adapted to exchange one value against another or one hash function against another hash function.

The term 'subset of bits' may denote a limited number of available bits of a digital pattern.

The term 'configurable' may denote a feature of, e.g., a hash function meaning an adaptability of a logic of the hash function. Another comparable expression may be 'programmable'. It may also mean selecting a certain number of input values such that they result in a different functionality of a configurable unit.

The term 'match' may denote a result of a comparison. If two digital values may be identical they match.

The term 'hash function logic' may denote a digital logic unit functioning as a hash function meaning that an input value may be converted to a corresponding hash value defined by the configuration of the hash function.

The term "hash function mask" may denote a digital filter that does not let all values pass that may be input to the mask.

It may be noted that a stream of incoming input vectors may be a stream of an input vector for a processor, e.g., a microprocessor, and that the input vector may represent addresses, data, as well as instructions for the processor. However, in other embodiments, it may not be an input stream for a processor, but for a function outside the kernel of the processor, a periphery chip or any other input vector stream receiving unit.

It should be noted that the number of entries storable in a second hash function table may be smaller than, or may be equal to the number of entries storable in a first hash table. Thus, the second hash table may require less space.

One example of an apparatus for creating hash values may offer the following:

Known hash function units working with a fixed hash function may result in poor performance because some hash functions may work quite well under some workloads of processors. In other cases and under a different set of workload of the processor that same hash function may result in a poorly performing processor because a lot of addressing conflicts may be generated.

One embodiment of providing two hash functions and a second hash function table having fewer entries for storing hash function values solves the problem of speed of the processor and required silicon area on the chip. Using the exchangeable hash function may result in a learning system or processor that may continuously choose the better hash function and improves its own operation. It may be important to notice that both hash functions are active at the same time. A dynamic evaluation may constantly evaluate the effectiveness of the hash functions. Based on such a dynamic evaluation of two competing hash functions to guarantee not any ordering conflict of the processor, a self-optimization of the processor and an adaption to different workload conditions may be achieved.

According to one embodiment of the apparatus, the input vector may represent an address value, e.g., a 64 bit wide address value readable by a processor, in particular a microprocessor. However, another width, e.g., like 32 bit, 128 bit, 256 or 512 and so on—or any other value—may be possible as well. And the input vector may also represent data or instruction coming as input stream into the processor. The input vector may also be one element of a mixture of address values, data and/or instructions for the processor.

According to one embodiment of an apparatus, a subset of bits, in particular all bits, in one example, of the input vector may be used as input values for each of a hash bit logic unit of the first hash function and/or for each of functional blocks of the second hash function, wherein each hash bit logic unit is differently configurable, wherein each functional block generates one bit of the related hash function value.

This means that the hash function is composed of a group of hash bit logic units—one for each bit of the hash value—and a configuration pattern or enabling bits used as second input to each of the hash bit logic units. Thus, a mixture of hardware and software is used to control the functioning of a hash function. This makes the used hash function good and easily configurable.

According to one embodiment of the apparatus, the replacement of the first hash function by the second hash function may be performed without delaying an input stream of the values of the input vector. A change from one hash to another may not stall the operation of the processor or, may only slow down the operation of the processor slightly.

According to one embodiment of the apparatus, a new hash value based on the first hash function may be compared to all entries of the first hash table. This feature may result in a detection of dependent input vectors meaning that they need to be executed in a fixed order. If a newly generated hash value of a newly incoming input vector may be equal to the hash value of a previous input vector, wherein the corresponding hash value is stored in the hash table, then a sequence violation may be highly probable and a strict ordering in the execution of the processor is required.

According to one embodiment of the apparatus, a new hash value based on the second hash function may be compared to all entries of the second hash table. Here, a respective comparison may be made, as just discussed on the paragraph above. However, a different, a second hash function may be used. This may result in a different set of matches of a newly generated hash value with stored hash values which may have been generated earlier. This way, the number of matches may be determined over time of the number of matches may be compared. It may be assumed that even with the lower number of entries in the second hash table if compared to the first hash table, equivalent result regarding ordering conflict may be generated.

According to one embodiment of the apparatus, the respective effectiveness of the first hash function and the second hash function may be determined based on a number of matches when comparing the newly generated hash value to all, in particular a subset, of entries in the first hash table and to all, in particular a subset, of entries in the second hash table. As discussed above, counting the number of matches, in particular, addressing conflicts, over time may be a good indication of an effectiveness of a certain hash function. A better hash function may replace the less good performing hash function. This way the second hash function may replace the first hash function to become the first, active hash function itself.

According to one embodiment of the apparatus, wherein after a replacement of the first hash function by the second hash function until all hash values in the entries of the first hash table are based on the replacing hash function values, a matching of new hash values with all hash table entries of the first hash table is assumed. Automatically assuming a matching may result in a strict ordering of input vector values of the input vector stream. This means that no other order of execution in the processor may be allowed than the one according to the incoming input vectors, although the processor may technically be prepared to act differently. After all hash values in the first hash table have been generated by the new hash function, the system may revert to the original mode of operation meaning that a strict ordering may only be required of a match between a newly generated hash function value by the then active first hash function and an entry in the first hash table has been determined.

In one embodiment, the apparatus may comprise additionally a hash function mask unit adapted to be activated after a replacement of the first hash function by the second hash function until all entries in the first hash table may be based on the replacing hash function values, wherein the hash function mask unit is also adapted to limit the comparison, in particular, the comparison between newly generated hash function value bits against entries in the hash function table to those bits of the new hash value of the first active new hash function that are identically generated if compared to the former second hash function. This may mean that not the complete number of bits of a newly generated hash function value has to be compared with all bits of all entries of the first hash table after a new hash function may be used as first hash function. When a new hash function may be used as first active hash function—which was before the second hash function—only a limited number of building instruction for individual bits of the new hash function value may have been changed if compared to the old first hash function. Thus, a comparison may only be required for those bits of the new hash function value which building instruction may not have been changed between the old first and the new first hash function. For all other bits, a match of a comparison is assumed. This will enhance the performance of the overall system because non-matching comparisons may still allow partial reordering of the execution.

In one embodiment, the hash function mask of the apparatus is a bit mask having a number of bits of the hash value of the first hash function. This means that the bit mask may also be equal to the length of the hash value of the second hash function. Thus, only those comparisons may be done that are required according to the explanation of the paragraph just above.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects are apparent from the examples of embodiments to be described hereinafter and are explained with reference to the examples of embodiments, but to which the invention is not limited.

In the following, a detailed description of the figures will be given. All instructions in the figures are schematic.

FIG. 1a shows a simple mechanism in a block diagram 101 to detect ordering conflicts of incoming input vectors 102 to a processor (not shown). Incoming input vectors 102 are stored in an input vector table 105 as entries 110. In a next action, a newly incoming input vector 102 may be compared to all entries of the input vector table 105. In case a match may be detected, the incoming input vectors have to be processed in the sequence they come into the processor because one incoming input vector, e.g., an address, or data or an instruction, may be dependent from another one. Signal 116 may be an indication of a required strict ordering. All comparison units 112 may be combined to a comparison unit block 114.

However, full length comparisons of incoming input vectors 102 to all entries 110 of the table 105 are costly in terms of speed and space required on the processor chip. For this purpose, only hash values may be compared. Comparing hash value may be a "good enough" indication of sequencing or ordering conflicts.

Figure 1B:
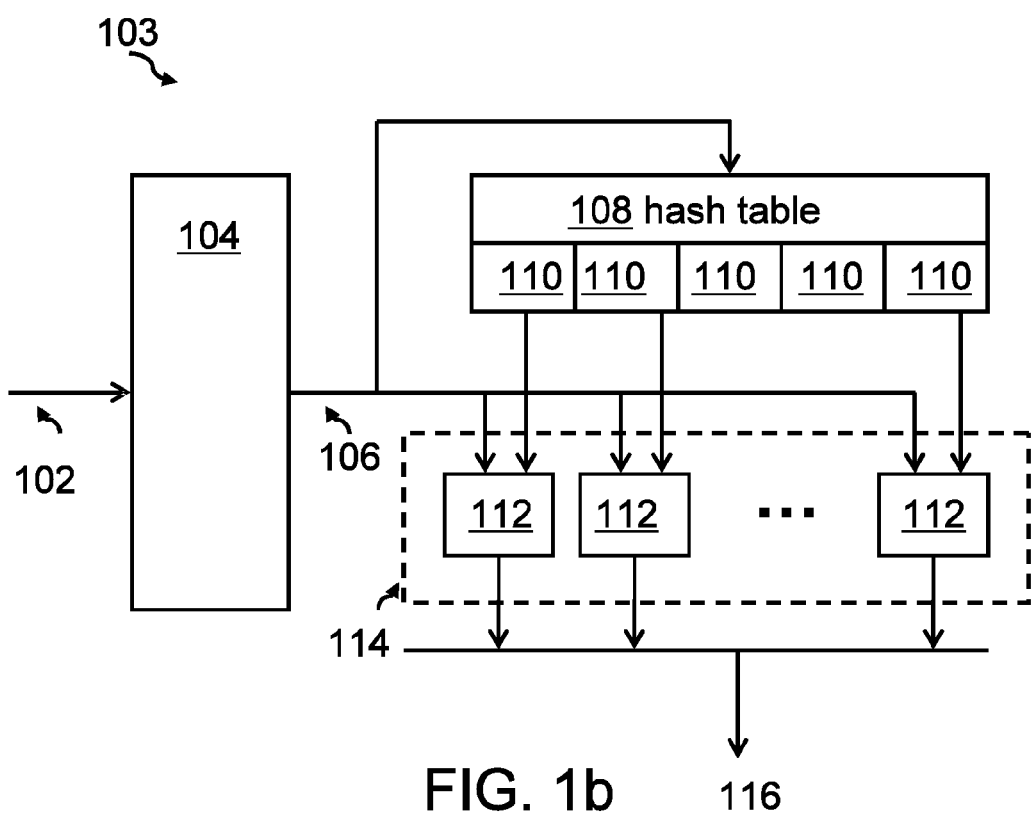
FIG. 1b shows a block diagram of elements in order to determine ordering conflicts.

FIG. 1b shows a block diagram 103 of elements in order to determine ordering conflicts for incoming addresses, data and instructions—in short input vectors 102—to a processor. FIG. 1b is very similar to FIG. 1a. Only a hash function unit 104 has been added. Now, hash values 106, having a smaller number of bits than the input vectors 102, may be stored in a hash table 108. Now comparisons are made between hash values by comparison units 112. This brings advantages in power consumption, speed and space requirement of the processor or microprocessor. It should be clear that all paths in the block diagram have a predefined width. The hash function block 104 may either comprise a fixed hash function or it may be programmable. However, according to state-of-the-art technologies, the hash function cannot be changed "on the fly".

Figure 2:
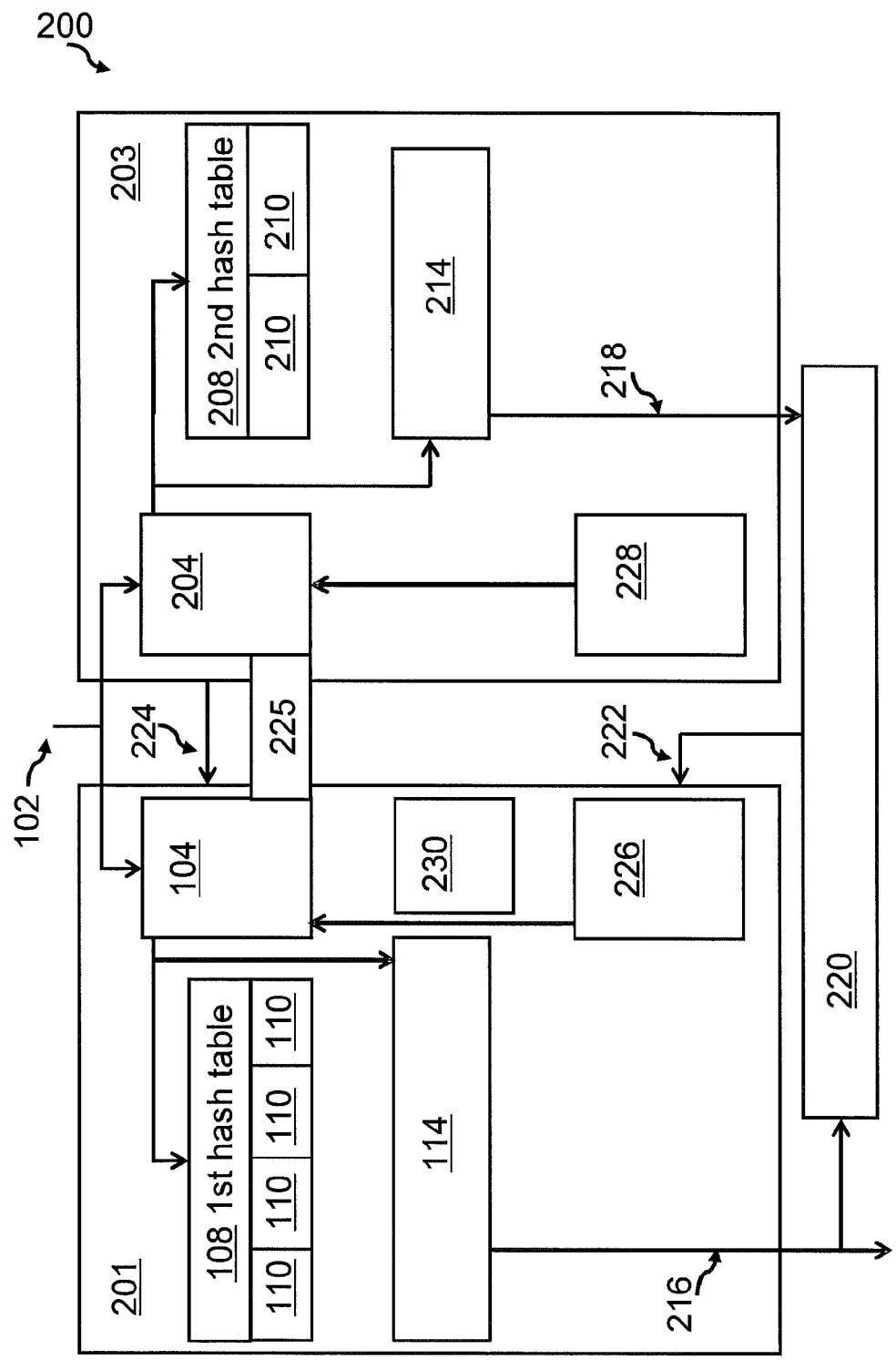
FIG. 2 shows an apparatus for creating hash values based on bit values of an input vector in an overview form.

FIG. 2 shows the apparatus 200 for creating hash values based on bit values of an input vector 102 in an overview form. Input vectors 102 coming in via a related path and may be split as input for active hash logic 201 and test hash function logic 203 or second hash function logic 203. Test hash function logic 203 has a smaller hash table 208 implemented if compared to the active hash table 104. Test hash function logic 203 has also some logic implemented in order to actively select or generate a hash function 204. Each of the hash logic blocks 201 and 203 deliver as output a respective partial ordering vector 216, 218. These are used as input for a partial ordering vector evaluation unit 220. Test hash function logic 203 may comprise also a second hash function 204. It is assumed that the hash function 104, 204 which determines less ordering conflicts using the hash table 108, 208 and the comparison units 114 and 214 performs better. The second hash table 208 has fewer entries 210 than the first hash table 108 has entries 110. If it is determined by the partial ordering vector evaluation unit 220 that the test hash function logic 203 causes less ordering conditions, a signal 222 is sent from the partial ordering vector evaluation unit 220 to the active hash logic 201. In that case, the active hash function 104 in the active hash logic 201 will be exchanged by the function of the test hash function 204 or second hash function 204. The information for the new hash function is coming via path 224 from the test hash function logic 203 to the active hash logic 201. An exchange unit 225 may be instrumental in exchanging the active hash function in unit 210 by the hash function 204 from unit 203. As already explained in the context of FIG. 1*b*, reference numeral 114 and 214 may represent the comparison units. It may be added that the exchange of the hash function may be performed by a change of the configuration of the respective hash function. The hardware components may stay unchanged.

Additionally, FIG. 2 shows two hash function generators, generator 226 on the side of the active hash logic 201 and another one 228 on the side of the test hash function logic 203. They both deliver input signals for the respective hash function or hash function value generator 104 and 204. More details will be discussed later (compare FIG. 5).

Moreover, a hash function mask 230 which will also be discussed later is shown in FIG. 2.

Figure 3:
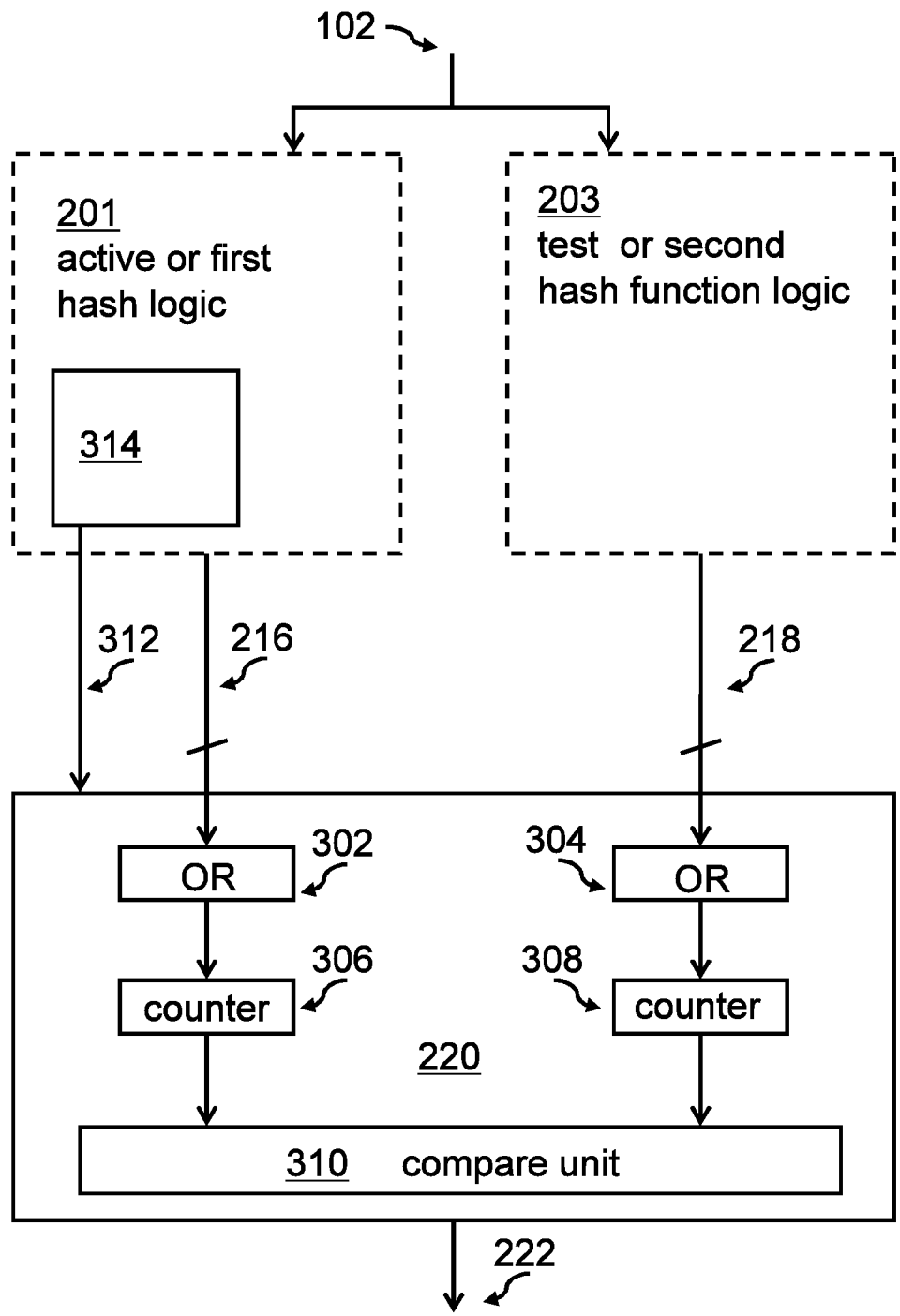
FIG. 3 shows the ordering vector evaluation logic in more detail.

FIG. 3 shows the ordering vector evaluation logic 220 in more detail. On top of FIG. 3, the active hash logic 201 and the hash function test logic 203 are shown. The partial ordering vectors 216, 218 are fed to the ordering vector evaluation unit 220. The partial ordering vectors 216 and 218 are as wide as each hash function value. All these individual signal lines are fed to OR-gates 302 and 304. In case one of the incoming bit lines to the OR-gates 302 or 304 are not equal to Zero, the output of the OR-gate 302 or 304 would be "1". A counter 306 or 308 will be increased by a count of "one". After a predefined period of time, a compare unit 310 compares the value of the two counters 306, 308. A higher number of counts may be equivalent to a higher number of ordering matches requiring a strict ordering as discussed above. This means that the two counters 306, 308 are instrumental units for evaluating a quality or effectiveness of the two hash functions in the hash function units 201 and 203. The counters increment if an ordering dependency was detected. As an output of the compare unit 310, a signal "change-hash-function" 222 will be generated (compare FIG. 2). This signal 222 will trigger an exchange of the active hash function by the second or test hash function for the next period of time. If this exchange happens, a signal 'reset_counters/start_evaluation' 312 will be sent from the active hash logic 201 to the ordering vector evaluation unit 220 so that the counters 306 and 308 are set to Zero and may start counting again for the next period of time. The signals 312 ('reset_counters/start_evaluation') will be generated by a function of the active hash logic named "change hash function FSM" (finite state machine) 314 which also controls the state of the active hash function 201.

Figure 4:
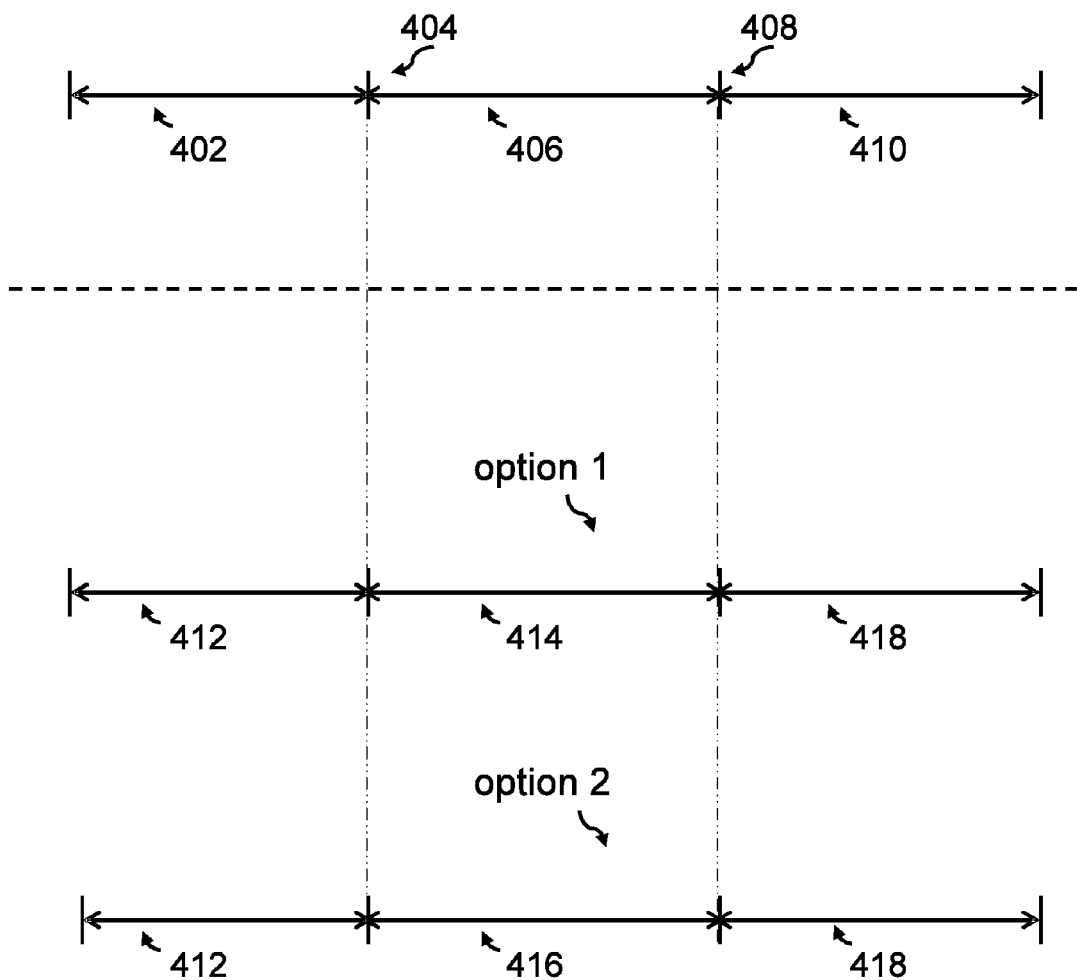
FIG. 4 shows different phases of changing from one active hash function to a second hash function.

FIG. 4 shows different phases of changing from one active hash function to a second hash function. During time frame 402, all hash table entries in the first hash table are calculated based on the active hash function. During the time period 410, all hash table entries in the first hash table are calculated based on the new, replacing hash function. At point in time 404, the active hash function is exchanged so that within time frame 406 some hash table entries in the first hash table are from the old active hash function while some hash table entries are already from the new, replacing hash function. At the point in time 408, no old hash function values are in use in the first hash table of the active hash function any longer.

Generally, two different options are available for handling the time frame 406 when a mixture of hash table entries from the old and the new hash function are present in the first hash table. According to option 1, during time frame 412, all comparisons of the hash function values with the entries of the first hash function table are OK and an ordering info may be derived from these comparisons. During time frame 418, according to the first option, again, all comparisons are OK and ordering info may be derived from the comparisons. However, in-between the points in times 404 and 408, during time frame 414 an ordering of the input vectors—comprising addresses, data and instructions—are forced automatically. This may slow down the performance of the processor. But, it may be ensured that a correct order of an incoming input vector stream is handled by the processor.

According to a second option, during time frame 416, if no ordering of incoming input vectors is enforced, many comparisons between the new hash value and the already stored hash values in the first hash table may still be OK, but some may not. In this case, a hash function mask may be used. Such a hash function mask may exclude those bits of the new, active hash function values for which the building instructions between the first, old hash function and the second hash function, which has replaced the first hash function in the active hash logic, are different. Only those bits of the newly generated hash value of the first hash function will be compared to corresponding bits of hash function values in the first hash table that have been built identically if comparing the new first active hash function with the former first hash function. All bits excluded by the hash function mask are assumed to match with corresponding entries in the first hash table.

As an explanation the following may serve: The previous second or test hash function has become the active or first hash function. Those bits of a new hash value being built by the newly active hash function—after the exchange—that are identical to the building instructions, meaning the former hash function before the exchange, of the hash value, may actively be compared to new hash values. For these bits of the hash value the comparison still makes sense. In contrast: For those bits for which the hash function has been changed, a comparison may not be meaningful. Thus, for these bits a match and consequently a strict ordering is assumed anyway. However, a match between a new hash value and an entry in the first hash table may only be determined if "old bits" and "new bits" match one by one. If no match may be found by the "old bits" a match may not be determined at all. Thus, it may only be required to form the hash function mask in a way that only "old bits" may be compared. If here no match may be determined then a complete match may be excluded meaning that no strict ordering may be required.

Thus, the hash function mask may reduce the number of bit comparisons, so that the overall performance of the processor may be increased.

Figure 5:
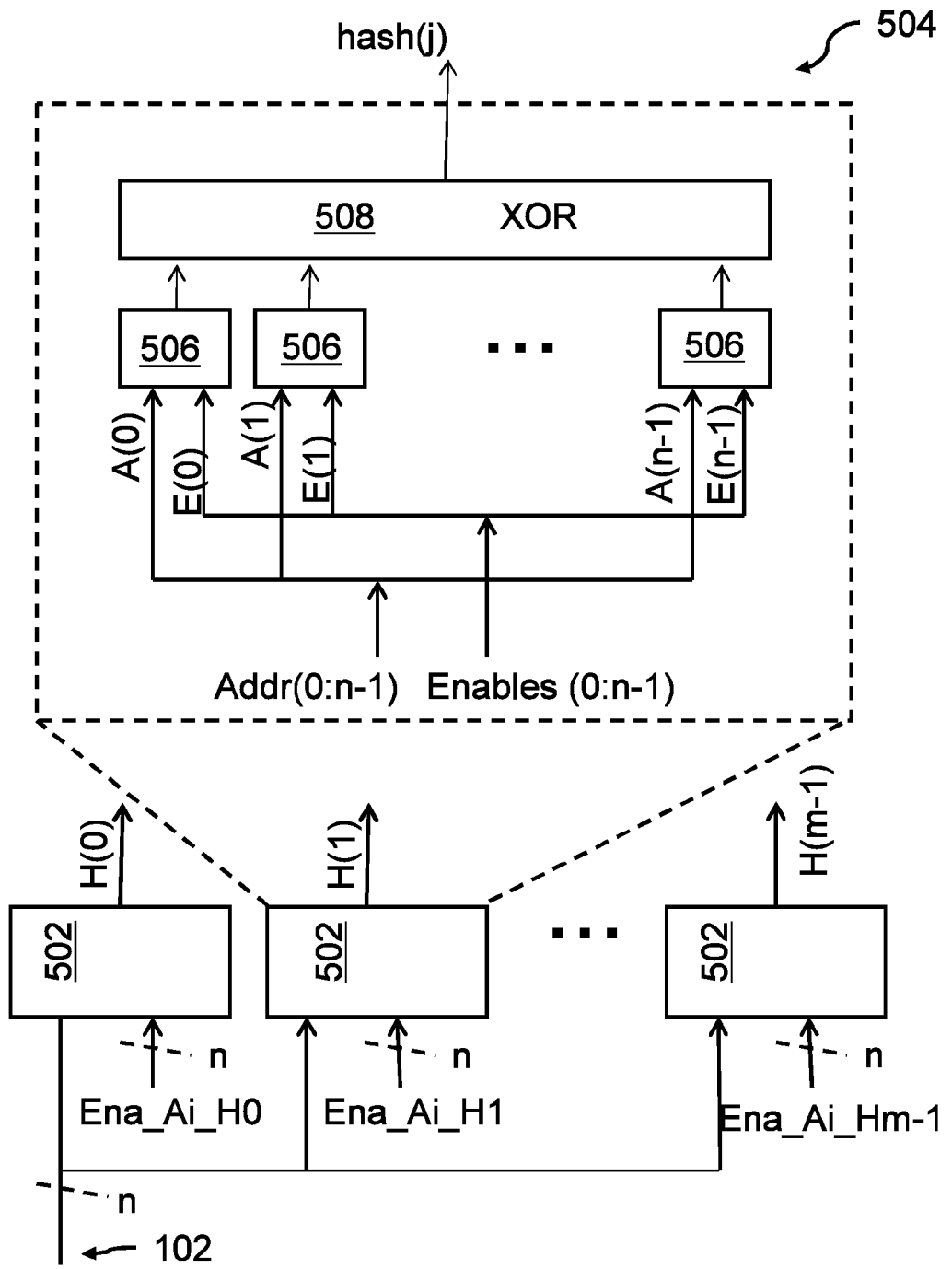
FIG. 5 shows an embodiment for an implementation of a hash function.

FIG. 5 shows an embodiment for an implementation of a hash function. The input vector 102 is fed with a full width of n bit into hash bit logic units 502. The second group of input signals is coming from 'enabling signals' to these hash bit logic units 502: Ena_Ai_H0, Ena_Ai_H1, . . . , Ena_Ai_Hm-1. Each hash bit logic block 502 is generating one bit of the hash function: H(0), H(1), . . . , H(m-1). The bit length of the hash function value is m. m is typically smaller than n which is the width of the input vector 102.

In block 504, a more detailed view of one of the hash bit logic blocks 502 is shown. As input, there are two vectors: Addr(0:n-1) and enabling signals Enables(0:n-1). These input signals correspond to the input vector 102 and the signals Ena_Ai_Hj. These input vectors are fed to AND-gates 506. Each of the AND-gates 506 inputs its output signal to an XOR-function 508. The result of that XOR-function is a single bit 'hash (j)' of the corresponding hash function.

It may be clear that the configurability of the hash function is defined by the hardware of the hash bit logic block 502 and the Enable signals that may be generated by a hash function generator. The blocks 502 may hardware-wise all be identical. In another embodiment they may be designed differently from block to block, e.g., not every bit of the input vector might be assignable to each bit of the hash function.

FIG. 6 shows a block diagram of an embodiment of a method 600 for creating hash values based on bit values of an input vector. The method 600 may comprise providing, 602, a first hash table, configuring, 604, a first hash function for a creation of a first hash value based on the bit values of the input vector, wherein the first hash value may be stored in the first hash table. The method may further comprise providing, 606, a second hash table with less entries than the first hash table, configuring, 608 the second hash function for a creation of a second hash value based on the bit values of the input vector, the second hash value to be stored in the second hash table, and comparing, 610 a respective effectiveness of the first hash function and the second hash function. The method may also comprise, responsive to the comparison, replacing, 612, the first hash function by the second hash function.

While aspects of the invention has been described with respect to a limited number of embodiments, those skilled in the art, having benefit of this disclosure, will appreciate that other embodiments may be devised, which do not depart from the scope of the invention, as disclosed herein. Accordingly, the scope of aspects of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. An apparatus for creating hash values based on bit values of an input vector, the apparatus comprising:
   a first hash table;
   a first hash function generator configured to configure a first hash function for creation of a first hash value based on the bit values of the input vector, the first hash value to be stored in the first hash table; and
   an evaluation unit responsive to the bit values of the input vector to test a second hash function, the evaluation unit comprising:
      a second hash table with fewer entries than the first hash table;
      a second hash function generator configured to configure the second hash function for creation of a second hash value based on the bit values of the input vector, the second hash value to be stored in the second hash table;
      a comparison unit to compare an effectiveness of the first hash function with an effectiveness of the second hash function; and
      an exchanging unit responsive to the comparison unit configured to replace the first hash function with the second hash function; and
   a hash function mask unit configured to be activated after the replacement of the first hash function with the second hash function, and configured to limit comparisons to those bits of a new hash value of the second hash function, which has replaced the first hash function, that are identically generated if compared to the first hash function.

2. The apparatus of claim 1, wherein the input vector represents an address value readable by a processor.

3. The apparatus of claim 1, wherein a subset of bits of the input vector is used as input values for a group of hash bit logic units of the first hash function and for a group of hash bit logic units of the second hash function, wherein each hash bit logic unit of the group of hash bit logic units of the first hash function is differently configurable, and wherein each hash bit logic unit of the group of hash bit logic units of the first hash function generates one bit (H($0$), H($1$), . . . , H(m-$1$)) of a hash function value generated by the first hash function.

4. The apparatus of claim 1, wherein the replacement of the first hash function with the second hash function is performed without delaying an input stream of the bit values of the input vector.

5. The apparatus of claim 1, wherein the hash function mask is a bit mask having a number of bits of the hash value of the first hash function.

6. The apparatus of claim 1, wherein a new hash value based on the second hash function is compared to entries of the second hash table.

7. The apparatus of claim 1, wherein based on the replacement of the first hash function with the second hash function and until a condition is met, a matching of new hash values to at least one hash table entry of the first hash table is assumed.

8. A computer program product for creating hash values based on bit values of an input vector, the computer program product comprising
    a non-transitory computer readable storage medium readable by a processing circuit and storing instructions for execution by the processing circuit for performing a method comprising:
        configuring a first hash function for creation of a first hash value based on the bit values of the input vector, the first hash value to be stored in a first hash table;
        configuring a second hash function for creation of a second hash value based on the bit values of the input vector, the second hash value to be stored in a second hash table, the second hash table having fewer entries than the first hash table;
        comparing an effectiveness of the first hash function with an effectiveness of the second hash function;
        based on the comparing, replacing the first hash function with the second hash function; and
        limiting, by a hash function mask unit configured to be activated after the replacement of the first hash function with the second hash function, comparisons to those bits of a new hash value of the second hash function, which has replaced the first hash function, that are identically generated if compared to the first hash function.

9. The computer program product of claim 8, wherein the input vector represents an address value readable by a processor.

10. The computer program product of claim 8, wherein a subset of bits of the input vector is used as input values for a group of hash bit logic units of the first hash function and for a group of hash bit logic units of the second hash function, wherein each hash bit logic unit of the group of hash bit logic units of the first hash function is differently configurable, and wherein each hash bit logic unit of the group of hash bit logic units of the first hash function generates one bit (H(0), H(1), . . . , H(m-1)) of a hash function value generated by the first hash function.

11. The computer program product of claim 8, wherein the replacement of the first hash function with the second hash function is performed without delaying an input stream of the bit values of the input vector.

12. The computer program product of claim 8, wherein the hash function mask is a bit mask having a number of bits of the hash value of the first hash function.

13. The computer program product of claim 10, wherein a new hash value based on the second hash function is compared to entries of the second hash table.

14. A method of creating hash values based on bit values of an input vector, the method comprising:
    configuring a first hash function for a creation of a first hash value based on the bit values of the input vector, the first hash value to be stored in a first hash table;
    configuring a second hash function for a creation of a second hash value based on the bit values of the input vector, the second hash value to be stored in a second hash table, the second hash table having fewer entries than the first hash table;
    comparing an effectiveness of the first hash function with an effectiveness of the second hash function;
    based on the comparing, replacing the first hash function with the second hash function; and
    limiting, by a hash function mask unit configured to be activated after the replacement of the first hash function with the second hash function, comparisons to those bits of a new hash value of the second hash function, which has replaced the first hash function, that are identically generated if compared to the first hash function.

15. The method of claim 14, wherein the input vector represents an address value readable by a processor.

16. The method of claim 14, wherein a subset of bits of the input vector is used as input values for a group of hash bit logic units of the first hash function and for a group of hash bit logic units of the second hash function, wherein each hash bit logic unit of the group of hash bit logic units of the first hash function is differently configurable, and wherein each hash bit logic unit of the group of hash bit logic units of the first hash function generates one bit (H(0), H(1), . . . , H(m-1)) of a hash function value generated by the first hash function.

17. The method of claim 14, wherein the hash function mask is a bit mask having a number of bits of the hash value of the first hash function.

* * * * *